Jan. 2, 1968   C. LUTTIK ET AL   3,361,979
APPARATUS FOR THE DETECTION OF THE SLOPE OF AN ELECTRIC SIGNAL
Filed March 17, 1964
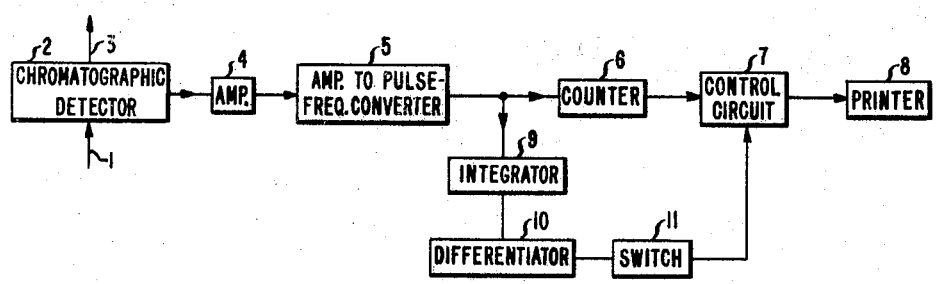
FIG. 1
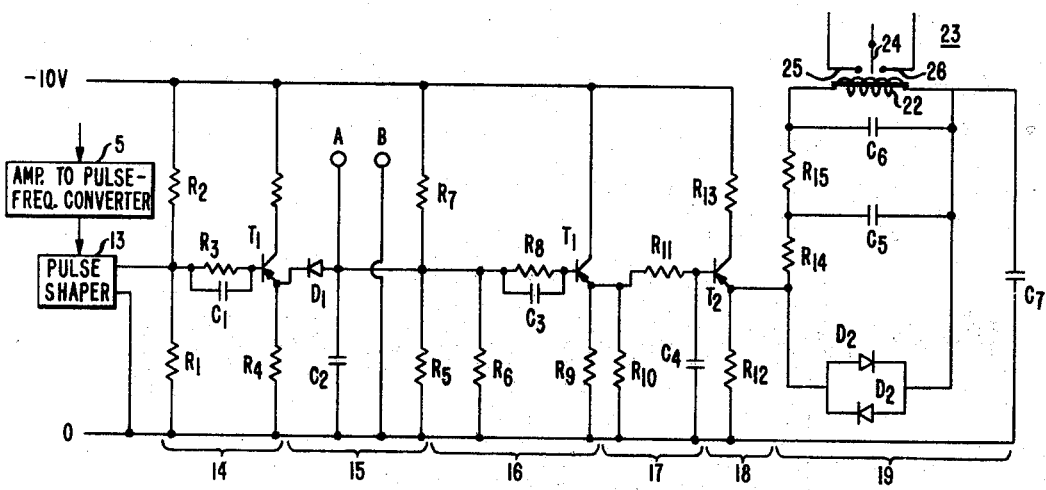
FIG. 2
FIG. 3
INVENTORS:
CO LUTTIK
ALBERTUS SCHURINGA
BY: *signature*
HIS ATTORNEY

United States Patent Office 3,361,979
Patented Jan. 2, 1968

3,361,979
APPARATUS FOR THE DETECTION OF THE SLOPE OF AN ELECTRIC SIGNAL
Co Luttik and Albertus Schuringa, Amsterdam, Netherlands, assignors to Shell Oil Company, New York, N.Y., a corporation of Delaware
Filed Mar. 17, 1964, Ser. No. 352,564
Claims priority, application Netherlands, Mar. 21, 1963, 290,465
4 Claims. (Cl. 328—114)

ABSTRACT OF THE DISCLOSURE

An apparatus for detecting the slope of an electrical signal wherein the signal is converted to a series of pulses whose frequency is related to the amplitude of the signal. The pulses are integrated and then differentiated. A switch circuit is connected to the differentiating circuit and indicates the start, maximum and end of the electrical signal.

The invention relates to a method and apparatus for the detection of the slope of an electric signal. The invention has particular application where the signal concerned is one whose value as a function of another condition, for example time, is known. If the signal to be detected should not be an electric one, it can, by means well known in the art be converted into a corresponding electric signal, as a result of which it becomes accessible to the method and can be handled by the apparatus according to the invention.

Detection of the slope of a signal is frequently employed in the automatic processing of results of various chemical and physical analyses, for instance, spectrometric or chromatographic analyses. The signal obtained in such analyses contains one or more peaks, each peak or group of peaks being characteristic of a given component or structural group present in the starting mixture. The processing of the analytical results may comprise, for instance, recording, integration or control of a process condition on the basis of the analysis processed. It is not, however, always essential for all the peaks of the signal obtained to be included in the further processing. If such is the case, it then becomes necessary to switch the processing apparatus on and off each time the desired peak appears and disappears again. If the signal consists of a single peak it may also be desirable to have the processing apparatus switched on only when the peak is present. This eliminates errors in the results due to disturbances between two consecutive peaks. As can readily be seen from the above-mentioned examples, in order to provide the switching of the signal at the proper time, a control voltage must be derived from the electric signal which is then applied to a switching device, such as, for example, a relay, a flip-flop, or a breakdown device.

A known procedure for initiating the proper switching is to detect the slope of the electric information signal by passing this signal to a differentiating circuit, mostly including an amplifier. This produces a signal which is the the derivative of the original signal with respect to the time, which sgnal is then used to control a switching device. As a rule, however, owing to the use of amplifiers, the control signals so derived contain disturbances referred to as "noise". This is true in particular for signals originating from chromatographic or spectrometric analyses, owing to the use of such detecting devices as flame-ionization detectors or heat-conductivity cells which generate additional noise. Noise can be characterized as an alternating voltage of variable frequency and variable amplitude. As well as noise, incidental voltage surges and more continuous alternating voltages, such as hum, may also occur as disturbances in the signal.

For the operation of a slope detector to be reliable, it is of great importance that the control of the switching device be as nearly immune as possible to the disturbances in the signal. Dependent on the disturbance level, a lower limit for the value of the signal can be determined at which the switching device can still be controlled unequivocally by a control voltage derived from the signal. This lower limit should be kept as low as possible in order to permit small signals and signals having a gentle slope to be handled. With the differentiating circuit with amplifier mentioned hereinabove, the lower limit of the signal that can still be handled appears to lie at 20–30 $\mu$v. per second.

The invention provides a means of considerably reducing the lower limit of the signal that can still be handled by the slope detector by insuring that only a very small proportion of the disturbances often already present in the signal can penetrate to the control voltage.

According to the invention the electric signal is first converted into a pulsating voltage from which the control voltage is derived. For the conversion of the electric signal into a pulsating voltage, use can be made of any appropriate type of converter well known in the art which converts amplitude to pulse frequency. In such a converter, for example, a capacitor is charged by the electric signal, either with or without use of an operational amplifier. When the potential of the capacitor reaches a certain value, a reversal or breakdown of an element coupled to the capacitor results, thereby generating a voltage pulse and discharging the capacitor. This process of charging and discharging continues as long as the value of the electric signal is larger than a certain minimum. If necessary, an amplifier stage can be inserted between the signal source and converter. The number of pulses per unit time increases with the instantaneous value of the electric signal. In general pulses of about equal value are obtained. With the aid of filter devices the pulses can be given a desired shape.

When utilizing this type of converter, not only is the signal itself applied to the capacitor, but naturally all the disturbances present in that signal are also supplied to the capacitor. Alternating voltages, however, have no lasting effect on the charge of the capacitor. Accordingly, when the time interval between two consecutive pulses is larger than the period of the disturbing alternating voltage, the influence of that alternating voltage on the moment at which the breakdown or reversal potential is reached becomes smaller. Consequently, since this is the case at small values of the electric signal, effects on the capacitor potential due to the noise signal itself and to varying amplitudes of the disturbing alternating voltage or noise signal will be more fully compensated. Furthermore, occasional voltage surges, which may be present in the signal as disturbances, will have no immediate effect on the generation of a pulse as long as that voltage surge does not cause the capacitor to reach the breakdown or reversal potential. Furthermore, compensation of a voltage surge as a result of a voltage surge in the opposite direction will become more probable as the time interval between two pulses becomes larger, i.e., as the electric signal becomes smaller. Hence, the pulsating voltage thus obtained is less influenced by disturbances as the electric signal which has produced the pulsating voltage has a smaller value. If, now, the control voltage for the switch device is derived from this pulsating voltage, the purpose in view, namely to insure that only a very small proportion of the disturbances often already present in the signal can penetrate to the control voltage, has been reached.

As well as the converter mentioned hereinbefore, one can also use a motor with an interrupter such as is also well known in the art. In this type of converter, the electric signal, generally after having been amplified, is passed to a motor, the speed of which is proportional to the amplitude of the electric signal. The interrupter, which is coupled to the shaft of the motor, produces the pulsating voltage; a given angular displacement of the shaft being necessary for the production of the next pulse. The influence of disturbances in the electric signal on the moment when the next pulse is produced therefore becomes smaller as the time interval between two consecutive pulses becomes larger. This is again the case at small values of the electric signal. Thus, the motor with interrupter is equally effective in rendering disturbances less harmful as the converter described hereinbefore.

The same effect of disturbances becoming less harmful at smaller values of the signal can also be attained with a converter based on the generation of a signal by mixing the output signals of two oscillators, the frequency of at least one of these oscillators being dependent on the instantaneous value of the electric signal. In this case the generation of a pulse is governed by the attainment of, for example, the maximum value of the voltage of the differential frequency resulting from the two interferring oscillator outputs. Accordingly, as more time is required for this value to be reached, the disturbances will have a greater chance of compensation and, hence, will have less influence on the moment a pulse is generated.

After the signal has been converted to a pulsating voltage in the manner described hereinbefore, the pulsating voltage is integrated and subsequently differentiated and the resulting signal is then used to control the switching device. This enables actions to be initiated, via the switching device, at the moment when the electric signal appears, when it reaches its maximum value and when it disappears. An action can also be initiated if desired when a preset maximum value of the electric signal is reached, as may occur if two peaks overlap. The control signal resulting from integration and differentiation of the pulsating voltage will result in an accurate control of the switching device since at the said three particular values of the electric signal mentioned above rapid changes in the control signal are obtained.

When performing the integration, it is further advantageous to effect the integration of the pulsating voltage in such a way that the integrated value is relatively large at small values of the electric signal. This causes the current obtained by differentiation to change still more rapidly at the beginning and at the end of the electric signal. An integration as referred to here can be obtained, for example, by charging a capacitor which is connected in parallel with a resistance, with the pulsating voltage via diode. With the slope detector according to the invention, it has been found that the lower limit of the signal that can still be handled is reduced to from 3–5 $\mu$ v. per second as opposed to the 20–30 $\mu$ v. per second lower signal limit attainable with prior art slope detectors of this type.

It should be noted that owing to the availability of a pulsating voltage, it is possible to readily make use of a memory, preferably a magnetic memory such as a magnetic tape recorder. A known procedure for signal processing is to record signals in this way and then play them back later for further processing. By recording at a low tape speed and playing back at a high tape speed, signals of small values or with slowly changing values in particular can be processed more accurately. This procedure can also be used in the detection of the slope of a signal according to the invention, which results in a further increase in accuracy. Naturally, in the further processing of the recorded voltage the original signal can be made visible again on a recorder or an oscilloscope. In certain cases a non-linear recording may be attractive, for instance with signals that vary widely in amplitude.

The invention will now be more fully explained with reference to the attached drawings wherein:

FIGURE 1 is a schematic diagram of a signal processing system incorporating the invention;

FIGURE 2 is a schematic diagram of a specific embodiment of a slope detector according to the invention; and, FIGURE 3 is a diagram showing the waveforms at various portions of the embodiment shown in FIGURE 2.

Referring now to FIGURE 1, there is shown a system according to the invention for analyzing the signals from a chromatographic analysis of a product or mixture. The mixture or product to be analyzed is passed via conduit 1 to any convenient chromatographic detector 2 which generates a pulse proportional to the quantity of the particular component being monitored which is present in the product or mixture. The mixture being analyzed leaves the chromatographic detector via the conduit 3. The electrical pulses generated by the chromatographic detector 2 are first amplified in an amplifier 4 and then fed to an amplitude to pulse-frequency converter 5 wherein each of the electrical peak signals is converted into a train of pulses, the number of pulses per unit time being proportional to the instantaneous amplitude of the signal. In order to process the information contained in the original chromatographic signal, the output pulse train from the converter 5 is passed to a counter 6 which counts the pulses in the pulse train and produces an output signal proportional thereto. The output signal from the counter 6 is passed via a control circuit 7, whose function will be more clearly explained below, to any desired storage device such as the printer 8.

The output pulse train from the converter 5 is also passed to an integrator 9 which has a long time constant relative to the duration of the individual pulses put out by the converter 5. The output signal from integrator 9, after proper filtering or smoothing if necessary, is then passed via a differentiator 10 to a switching device 11 which is responsive to the output signal of differentiator 10 to produce an output signal corresponding to the start, maximum and end, or any other combination of these points, of the original peak signal entering the converter 5. The output signal from switching device 11 is then utilized to control the control circuit 7 which in turn controls the readout and printing of the information from the counter 6.

Referring now to FIGURES 2 and 3 there is shown a specific embodiment of the slope detector according to the invention. The specific values of the components shown in the figure being as follows:

| | | |
|---|---|---|
| $R_1$ | megohms | 3.9 |
| $R_2$ | do | 3.9 |
| $R_3$ | kilohms | 3.3 |
| $R_4$ | do | 3 |
| $R_5$ | do | 15 |
| $R_6$ | megohms | 3.9 |
| $R_7$ | do | 3.9 |
| $R_8$ | kilohms | 3.3 |
| $R_9$ | do | 3 |
| $R_{10}$ | do | 5.6 |
| $R_{11}$ | do | 1 |
| $R_{12}$ | do | 1 |
| $R_{13}$ | ohms | 47 |
| $R_{14}$ | do | 470 |
| $R_{15}$ | do | 500 |
| $C_1$ | microfarads | 4 |
| $C_2$ | do | 25 |
| $C_3$ | do | 4 |
| $C_4$ | do | 1250 |
| $C_5$ | do | 1000 |
| $C_6$ | do | 1000 |
| $C_7$ | do | 1250 |
| $T_1$ | | OC 71 |
| $T_2$ | | BCZ 11 |
| $D_1$ | | FD 3 |
| $D_2$ | | OA 85 |

As shown in the figures, the electrical output peak from the chromatographic detector (FIGURE 3a) is fed to the amplitude to pulse-frequency converter 5 which in this specific example preferably has a pulse-frequency range from 0–10,000 cycles/sec. The output of converter 5, after proper shaping in the pulse shaper 13 to insure uniformly shaped pulses, appears as shown in FIGURE 3b. It should be understood that the output pulses from the converter 5 are shown as negative pulses due to the particular configuration of the remaining circuitry but that systems according to the invention utilizing positive pulses and consequently generating signals opposite in polarity from those shown in the remaining portions of FIGURE 3 may be utilized. The shaped train of pulses, as shown in FIGURE 3b, is then connected via an emitter-follower stage 14, which is used for impedance matching, to an integrating circuit 15 having, as mentioned above, a relatively long time constant relative to the duration of the individual pulses from the converter 5, and consisting of diode $D_1$, a capacitor $C_2$ and a resistance $R_5$. The negative pulse train appearing at the output of the emitter-follower stage 14 is passed via the diode $D_1$ to charge up the capacitor $C_2$; the diode $D_1$ preventing the charge on the capacitor $C_2$ from discharging through the Resistor $R_4$. Although the signal across the capacitor $C_2$ would normally result in an everincreasing staircase type wave due to the relatively long time constant of the integrating circuit, in the instant example about 0.4 second, the output signal across the capacitor $C_2$ resulting from the pulse train will, instead of an everincreasing staircase wave, result in a peak type wave having a staircase shaped envelope. If desired, data processing equipment, i.e. printer 8 may be connected to the terminals A and B which are connected across capacitor $C_2$.

The voltage signal across the capacitor $C_2$ is fed via another emitter-follower stage 16 for impedance matching to a filter 17 where the staircased envelope peak is smoothed resulting in the waveform shown in FIGURE 3c. As can be seen from a comparison of this waveform with that shown in FIGURE 3a, the output of the filter 17 is a wave having a shape similar to that of the original peak but having steeper slopes at its start and end. This is caused by the relatively long time between pulses applied to the capacitor which correspond to low amplitudes of the original signal peak.

The output signal from the filter 17 is applied via another emitter-follower stage 18, again for impedance matching, to a differentiating circuit 19 consisting essentially of a capacitor $C_7$ and the coil 22 of a polarized relay 23 which forms the output switching device of the slope detector. The resistors $R_{14}$ and $R_{15}$, condensers $C_5$ and $C_6$ and diodes $D_2$ are provided to reduce any noise in the current applied to the differentiator due to frequency jitter occurring in the voltage to frequency converter and to protect the relay 23 against overloading.

Polarized relay 23 which is actuated by the current through the condenser $C_7$, and hence the time differential of the voltage output signal from emitter-follower stage 18, consists of a relay having a center stable contact 24 and two make contacts 25 and 26. Closure of the contact 24 with the contact 25 or 26 is affected when a small positive or a small negative current is passed through the coil 22. These levels of current are indicated as dotted lines 29 and 30 in FIGURE 3d. Because of the relatively steep slope of the curve shown in 3d, closure of the contacts 24 and 25 at a level corresponding to dotted line 29 indicates the start of the original peak (FIGURE 3a). As shown in FIGURE 3e, contacts 24 and 25 remain closed as long as the current is above the level indicated by line 29. As the voltage applied to the differentiator 19 reaches its maximum, the current through the condenser $C_7$ and consequently the relay coil 29 reaches a level indicated by the dotted line 30, thereby closing contacts 24 and 26 and indicating that the original peak signal has reached its maximum value. As indicated in FIGURE 3f, contacts 24 and 26 remain closed as long as the current is below the level indicated by dotted line 30; breaking of contacts 24 and 26 indicating the end of the original peak.

Signals generated by the closing and opening of contacts 24–26 (FIGURES 3e and 3f) may then be utilized to control the control circuit 7 of FIGURE 1 to initiate the count and readout of the counter 6. It should be noted that although a polarized relay type of output switching device has been shown, that any type of conventional differentiating circuit coupled to a bistable or tristable switching network may be utilized.

*Example*

In order to illustrate the improved results obtained with a slope detector according to the invention over the prior art type of slope detector, comparison tests were made using a slope detector as shown in FIGURE 2 and a differentiating type of slope detector as known in the prior art and utilizing electrical signals produced by a peak voltage generator. The peaks produced had different maximum values but a constant width of 100 seconds, with each peak having approximately the shape of a Gaussian curve. The results of these comparison tests indicating the maximum value of the peak signals at which the respective slope detectors respond or do not respond are shown below.

| Maximum value of signal in MV | Action of— | |
|---|---|---|
| | Detector according to the invention | Detector according to prior art |
| 96 | Yes | Yes |
| 24 | Yes | Yes |
| 8 | Yes | Yes |
| 4 | Yes | Yes |
| 3.2 | Yes | Yes |
| 2.4 | Yes | No |
| 1.6 | Yes | No |
| 0.8 | Yes | No |
| 0.4 | Yes | No |
| 0.3 | Yes | No |
| 0.2 | No | No |

As can easily be seen from these tests, the slope detector according to the invention still responds to a signal of a value about 10 times smaller than a detector according to the prior art.

Obviously various modifications of the invention are possible in light of the above teachings without departing from the spirit of the invention. It is therefore to be understood that within the scope of the appended claims, the invention may be practiced otherwise than as specifically described.

We claim as our invention:

1. Apparatus for the detection of a slope of an electrical peak signal comprising:
   (a) signal generator means for producing said electrical peak type signal;
   (b) an amplitude to pulse-frequency converter connected to the output of said signal generator means;
   (c) integrator means connected to the output of said amplitude to pulse-frequency converter for integrating the train of output pulses from said converter, said integrator means having a relatively long time constant with respect to the duration of the individual pulses at the output of said converter;
   (d) a differentiating circuit connected to the output of said integrator means; and,
   (e) switch means connected to the output of said differentiating circuit and responsive to the output signal therefrom for producing an indication corresponding to the start, maximum and end of said electrical peak type signal.

2. The apparatus of claim 1 wherein said integrating means comprises: a diode having one electrode connected to the output of said amplitude to pulse-frequency converter and having the second electrode thereof connected to a capacitor and a resistance connected in parallel.

3. Apparatus for processing chromatographic signals comprising:

(a) a chromatographic detector for producing an electrical peak signal characteristic of a given component of a mixture to be analyzed;

(b) an amplitude to pulse-frequency converter connected to the output of said chromatographic detector;

(c) counter means connected to the output of said converter for producing an output signal proportional to the number of pulses received;

(d) integrating means connected to the output of said converter for integrating the output train of pulses from said converter, said integrating means having a relatively long time constant with respect to the duration of the individual pulses at the output of said converter;

(e) a differentiator connected to the output of said integrating means; and, (f) means responsive to the output of said differentiator for controlling the readout of said counter means.

4. The apparatus of claim 3 wherein said integrating means comprises a diode having one electrode connected to the output of said converter and the other electrode connected to a capacitor and resistance connected in parallel.

References Cited
UNITED STATES PATENTS

| | | | |
|---|---|---|---|
| 2,547,978 | 4/1951 | Ryerson et al. | 328—150 |
| 3,068,418 | 12/1926 | Hajian | 328—150 X |
| 3,251,053 | 5/1966 | Doong | 328—150 X |

ARTHUR GAUSS, *Primary Examiner.*

J. ZAZWORSKY, *Assistant Examiner.*